United States Patent
Guruswamy (10) Patent No.: US 9,172,611 B2
(45) Date of Patent: Oct. 27, 2015

(54) SYSTEM AND METHOD FOR DISCOVERING ASSETS AND FUNCTIONAL RELATIONSHIPS IN A NETWORK

(75) Inventor: Kowsik Guruswamy, Sunnyvale, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 1569 days.

(21) Appl. No.: 12/260,438

(22) Filed: Oct. 29, 2008

(65) Prior Publication Data

US 2010/0106742 A1    Apr. 29, 2010

(51) Int. Cl.
*G06F 17/30* (2006.01)
*H04L 12/24* (2006.01)

(52) U.S. Cl.
CPC ............. *H04L 41/12* (2013.01); *H04L 41/0213* (2013.01)

(58) Field of Classification Search
None
See application file for complete search history.

(56) References Cited

U.S. PATENT DOCUMENTS

| | | | |
|---|---|---|---|
| 5,067,104 A | 11/1991 | Krishnakumar et al. | |
| 5,185,860 A * | 2/1993 | Wu .............................. | 709/224 |
| 5,459,837 A | 10/1995 | Caccavale | |
| 5,485,409 A | 1/1996 | Gupta et al. | |
| 5,892,903 A | 4/1999 | Klaus | |
| 6,088,804 A | 7/2000 | Hill et al. | |
| 6,324,656 B1 | 11/2001 | Gleichauf et al. | |
| 6,363,477 B1 | 3/2002 | Fletcher et al. | |
| 6,574,737 B1 | 6/2003 | Kingsford et al. | |
| 6,584,569 B2 | 6/2003 | Reshef et al. | |
| 6,609,205 B1 | 8/2003 | Bernhard et al. | |
| 6,654,914 B1 | 11/2003 | Kaffine et al. | |
| 6,697,751 B2 | 2/2004 | Skingsley et al. | |
| 6,952,779 B1 | 10/2005 | Cohen et al. | |
| 7,152,105 B2 | 12/2006 | McClure et al. | |
| 7,159,151 B2 | 1/2007 | Morgan et al. | |
| 7,178,166 B1 | 2/2007 | Taylor et al. | |
| 7,181,769 B1 | 2/2007 | Keanini et al. | |
| 7,185,109 B2 | 2/2007 | Conrad et al. | |
| 7,185,232 B1 | 2/2007 | Leavy et al. | |

(Continued)

FOREIGN PATENT DOCUMENTS

WO    2006/099536    9/2006

OTHER PUBLICATIONS

"Cisco Discovery Protocol." Posted on <http://netcert.tripod.com/switches/cdp.html>. May 23, 2007.*

(Continued)

*Primary Examiner* — Scott B Christensen
(74) *Attorney, Agent, or Firm* — Haynes Beffel & Wolfeld LLP; Ernest J. Beffel, Jr.

(57) ABSTRACT

A discovery system (and corresponding method and computer program product) for automatically discovering assets and their roles and functional relationships in a network system is described. In one aspect, the discovery system interrogates known assets through protocol messages, normalizes response messages, and contextually analyzes the normalized response message to identify additional assets and their roles and functional relationships with the interrogated assets. The discovery system can recursively interrogate newly discovered assets to discover additional assets. In another aspect of the present invention, the discovery system is scheduled to periodically interrogate known assets for up-to-date information of the assets and their roles and functional relationships. Such information can be used to provide various services.

26 Claims, 8 Drawing Sheets

(56) References Cited

U.S. PATENT DOCUMENTS

| | | |
|---|---|---|
| 7,243,148 B2 | 7/2007 | Keir et al. |
| 7,257,630 B2 | 8/2007 | Cole et al. |
| 7,272,650 B2 | 9/2007 | Elgebaly et al. |
| 7,278,061 B2 | 10/2007 | Smith |
| 7,290,145 B2 | 10/2007 | Falkenthros |
| 7,315,801 B1 | 1/2008 | Dowd et al. |
| 7,342,892 B2 | 3/2008 | Soon et al. |
| 7,346,922 B2 | 3/2008 | Miliefsky |
| 7,421,621 B1 | 9/2008 | Zambrana |
| 7,447,966 B2 | 11/2008 | Kamannavar et al. |
| 7,451,488 B2 | 11/2008 | Cooper et al. |
| 7,471,999 B2 | 12/2008 | Taki |
| 7,509,675 B2 | 3/2009 | Aaron |
| 7,512,125 B2 | 3/2009 | Betts et al. |
| 7,536,456 B2 | 5/2009 | Williams et al. |
| 7,536,605 B2 | 5/2009 | Keaffaber et al. |
| 7,543,056 B2 | 6/2009 | McClure et al. |
| 7,594,142 B1 | 9/2009 | O'Leary et al. |
| 7,607,170 B2 | 10/2009 | Chesla |
| 7,624,422 B2 | 11/2009 | Williams et al. |
| 7,627,669 B2 | 12/2009 | Dugatkin et al. |
| 7,627,891 B2 | 12/2009 | Williams et al. |
| 7,627,900 B1 | 12/2009 | Noel et al. |
| 7,664,845 B2 | 2/2010 | Kurtz et al. |
| 7,673,043 B2 | 3/2010 | Keir et al. |
| 7,774,637 B1 | 8/2010 | Beddoe et al. |
| 7,954,161 B1 | 5/2011 | Guruswamy et al. |
| 7,958,230 B2 | 6/2011 | Guruswamy et al. |
| 7,958,560 B1 | 6/2011 | Guruswamy |
| 8,095,982 B1 | 1/2012 | Guruswamy |
| 8,095,983 B2 | 1/2012 | Guruswamy |
| 2001/0034847 A1 | 10/2001 | Gaul, Jr. |
| 2002/0022952 A1* | 2/2002 | Zager et al. ............ 703/22 |
| 2002/0157041 A1 | 10/2002 | Bennett et al. |
| 2003/0009696 A1 | 1/2003 | Bunker V. et al. |
| 2003/0051163 A1 | 3/2003 | Bidaud |
| 2003/0154399 A1 | 8/2003 | Zuk et al. |
| 2003/0159063 A1 | 8/2003 | Apfelbaum et al. |
| 2004/0001443 A1 | 1/2004 | Soon et al. |
| 2004/0068586 A1 | 4/2004 | Xie et al. |
| 2004/0068675 A1 | 4/2004 | Liu |
| 2004/0103315 A1 | 5/2004 | Cooper et al. |
| 2004/0205557 A1 | 10/2004 | Bahrs et al. |
| 2004/0230881 A1 | 11/2004 | Gwak |
| 2005/0015213 A1 | 1/2005 | Somervill et al. |
| 2005/0044418 A1 | 2/2005 | Miliefsky |
| 2005/0135391 A1 | 6/2005 | Sung |
| 2005/0144137 A1 | 6/2005 | Kumar et al. |
| 2005/0195820 A1 | 9/2005 | Betts et al. |
| 2005/0248457 A1 | 11/2005 | Himberger et al. |
| 2005/0273772 A1 | 12/2005 | Matsakis et al. |
| 2005/0273854 A1 | 12/2005 | Chess et al. |
| 2005/0273859 A1 | 12/2005 | Chess et al. |
| 2006/0005231 A1 | 1/2006 | Zuk et al. |
| 2006/0015941 A1 | 1/2006 | McKenna |
| 2006/0015943 A1 | 1/2006 | Mahieu |
| 2006/0021034 A1 | 1/2006 | Cook |
| 2006/0021044 A1 | 1/2006 | Cook |
| 2006/0021045 A1 | 1/2006 | Cook |
| 2006/0021046 A1 | 1/2006 | Cook |
| 2006/0021047 A1 | 1/2006 | Cook |
| 2006/0021048 A1 | 1/2006 | Cook et al. |
| 2006/0021049 A1 | 1/2006 | Cook |
| 2006/0036755 A1 | 2/2006 | Abdullah et al. |
| 2006/0080733 A1 | 4/2006 | Khosmood et al. |
| 2006/0085723 A1 | 4/2006 | Bartz et al. |
| 2006/0098579 A1 | 5/2006 | Chang et al. |
| 2006/0106939 A1 | 5/2006 | Cha et al. |
| 2006/0137009 A1 | 6/2006 | Chesla |
| 2006/0277606 A1 | 12/2006 | Yunus et al. |
| 2007/0006037 A1 | 1/2007 | Sargusingh et al. |
| 2007/0011319 A1 | 1/2007 | McClure et al. |
| 2007/0086389 A1 | 4/2007 | Park et al. |
| 2007/0094728 A1 | 4/2007 | Julisch et al. |
| 2007/0115962 A1 | 5/2007 | Mammoliti et al. |
| 2007/0174917 A1 | 7/2007 | Guruswamy |
| 2007/0204347 A1 | 8/2007 | Caceres et al. |
| 2008/0005555 A1 | 1/2008 | Lotem et al. |
| 2008/0072322 A1 | 3/2008 | Guruswamy |
| 2008/0092237 A1 | 4/2008 | Yoon et al. |
| 2008/0098479 A1 | 4/2008 | O'Rourke et al. |
| 2008/0120283 A1 | 5/2008 | Liu et al. |
| 2008/0155338 A1 | 6/2008 | Rusmanov |
| 2008/0282352 A1 | 11/2008 | Beddoe et al. |
| 2009/0083854 A1 | 3/2009 | Bozanich et al. |
| 2009/0161565 A1 | 6/2009 | Reniere |
| 2009/0172148 A1 | 7/2009 | Underwood |
| 2009/0271863 A1 | 10/2009 | Govindavajhala et al. |
| 2009/0320137 A1 | 12/2009 | White et al. |
| 2009/0328190 A1 | 12/2009 | Liu et al. |
| 2010/0106742 A1 | 4/2010 | Guruswamy et al. |
| 2010/0284282 A1 | 11/2010 | Golic |
| 2010/0284283 A1 | 11/2010 | Golic et al. |
| 2010/0293415 A1 | 11/2010 | Beddoe et al. |

OTHER PUBLICATIONS

Russell, et al., "The Bayeux Specification," 2007, downloaded from http://svn.cometd.com/trunk/bayeux/bayeux.html on Apr. 10, 2012.

"Session Initiation Protocol (SIP)," downloaded from http://searchunifiedcommunications.techtarget.com/definition/Session-Initiation-Protocol on Apr. 10, 2012.

"File Transfer Protocol," downloaded from http://en.wikipedia.org/wiki/List_of_FTP_commands on Apr. 10, 2012.

"List of FTP server return codes," downloaded from http://en.wikipedia.org/wiki/List_of_FTP_server_return_codes on Apr. 10, 2012.

"MGCP, Multimedia Gateway Control Protocol," downloaded from http://www.networksorcery.com/enp/protocol/mgcp.htm on Apr. 10, 2012.

U.S. Appl. No. 13/345,323 for "Analyzing the Security of Communication Protocols and Channels for a Pass Through Device", filed on Jan. 6, 2012.

U.S. Appl. No. 13/345,332 for "Platform for Analyzing the Security of Communication Protocols and Channels", filed on Jan. 6, 2012.

"Cisco Discovery Protocol" posted at: http://netcert.tripod.com/ccna/switches/cdp.html on May 23, 2007.

U.S. Appl. No. 11/858,779 for "SYNTAX-Based Security Analysis Using Dynamically Generated Test Causes", filed on Sep. 20, 2007.

U.S. Appl. No. 11/745,338 for "Modification of Messages for Analyzing the Security of Communication Protocols and Channels", filed on May 7, 2007.

U.S. Appl. No. 11/557,945 for "Reconfigurable Message-Delivery Preconditions for Delivering Attacks to Analyze the Security of Networked Systems", filed on Nov. 8, 2006.

U.S. Appl. No. 13/153,797, filed Jun. 6, 2011.

U.S. Appl. No. 11/154,636, filed Jul. 7, 2011.

Wagner, D. et al., "Intrusion Detection Via Static Analysis", IEEE Symposium on Security and Privacy, 2001, pp. 156-168.

Finlay, I. et al., "Multiple Vulnerabilities in Many Implementations of the Simple Network Management Protocol (SNMP)", CERT® Advisory CA-2002-03, Pittsburgh, PA, US.

Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.

Kaksonen, R., "A Functional Method for Assessing Protocol Implementation Security", VTT Publications 448, 2011, 128 p.+app. 15p., Technical Research Centre of Finland, FI.

Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.

Miller, B. et al., "Fuzz Revisited: A Re-examination of the Reliabiltiy of Unix Utilities and Services", Computer Sciences Department, Oct. 1995, pp. 1-23, Madison, Wisconsin, US.

PROTOS Test-Suite: c06-snmpv1, University of Oulu (ee.oulu.fi)—http://www.ee.oulu.fi/research/ouspg/protos/testing/c06/snmpv1/index, Oct. 17, 2002, pp. 1-26, Finland.

(56) References Cited

OTHER PUBLICATIONS

PROTOS Test-Suite: c06-Idapv3, University of Oulu (ee.oulu.fi)—http://www.ee.oulu.fi/research/ouspg/protos/testing/c06/Idapv3/index.html, Dec. 2001, p. 1-13, Finland.

Beddoe, M., "Network Protocol Analysis using Bioinformatics Algorithms", 2004, retrieved on May 17, 2007, from <URL: http://www.4tphi.net/~awalters/PI/pi.pdf>.

Case, J. et al., "A Simple Network Management Protocol (SNMP)" (RFC 1157), May 1990, retrieved on May 17, 2007, from <URL: http://www.faqs.org/rfcs/rfc1157.html>.

Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.

McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.

Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.

Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://post.queensu.ca/~trd/research/papers/FinalPST04.pdf>.

Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://postqueensu.ca/~trd/research/papers/MILCOM.pdf>.

Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://postqueensu.ca/~trd/research/papers/zhangState.pdf>.

Zhang, S. et al., "Applying Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.

Aitel, D., "An Introduction to SPIKE, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-us-02-aitel-spike.ppt>.

Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.

Beddoe, M., "The Protocol Informatics Project: Automating Network Protocol Analysis" (presentation slides), 2005.

Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.

Beizer, B., "Chapter 9: Syntax Testing", in Software Testing Techniques, 2nd Ed., 1990, pp. 284-319, Van Nostrand Reinhold, New York, NY.

Beizer, B., "Chapter 8: Syntax Testing", in Black-Box Testing: Techniques for Functional Testing of Software and Systems, 1995, pp. 177-201, John Wiley & Sons, Inc., New York, NY.

Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.

Mu Security, "6 Degrees of Protocols", 2006.

Mu Security, "Protocol Vulnerability Patterns", Apr. 2006.

Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.

Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntaxc%20Testing.ppt>.

Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.

Bellovin, S. "A Technique for Counting NATted Hosts", Proceedings: Second Internet Measurement Workshop (IMW), Marseille, France, Nov. 6-8, 2002, pp. 267-272.

Bradner, S. et al., "Benchmarking Methodology for Network Interconnect Devices (RFC_1944)", May 1996, online, retrieved on May 12, 2006, from <URL: http://rfc.net/rfc1944.html>.

Bradner, S. et al., Benchmarking Methodology for Network Interconnect Devices (RFC_2544), Mar. 1999, online, retrieved on May 12, 2006, from <URL: http://rfc.net/rfc2544.html>.

Cisco Systems, Inc., "Mobile IP—NAT Detect" in "Cisco IOS IP Mobility Configuration Guide, Release 12.4.", 2005, online, retrieved on May 12, 2006, from <URL: http://www.cisco.com/univercd/cc/td/doc/product/software/ios124/124cg/himo_c/ch05/hnatray.pdf>.

Dunn, J. et. al., "Methodology for ATM Benchmarking (RFC 3116)", Jun. 2011, online, retrieved on May 12, 2006, from <URL: http://rfc.net/rfc3116.html>.

Egevang, K., et al., "The IP Network Address Translator (NAT) (RFC 1631)", May 1994, online, retrieved on May 12, 2006, from <URL: http://rfc.net/rfc3116.html>.

Microsoft Corp., "Overview of Network Address Translation (NAT) in Windows XP", Sep. 12, 2005, online, retrieved on May 12, 2006, from <URL: http://www.microsoft.com/technet/prodtechnol/winxppro/deploy/nattrnsw.mspx?pd=true>.

Netcom Systems, "SmartWindow User Guide Version 6 53", Document No. 340-1020-001 REV C, Dec. 1999, online, retrieved on May 12, 2006, from <URL: https://www.cobra.ee.ntu.edu.tw/~oops/HTML6/08_exp/smartbit%20reading.pdf>.

Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~Ijilja/cnl/pdf/milan.pdf>.

Sorensen, S., "Intrusion Detection and Prevention Protecting Your Network from Attacks", Document No. 200065-002, 2006, online, retrieved on May 12, 2006, from <URL: http://www.juniper.net/solutions/literature/white_papers/200065.pdf>.

Srisuresh, P. et al., "IP Network Address Translator (NAT) Terminology and Considerations (RFC 2663)", Aug. 1999, online, retrieved on May 12, 2006, from <URL: http://rfc/net/rfc2663.html>.

Srisuresh, P. et al., "Traditional IP Network Address Translator (Traditional NAT) (RFC 3022)", Jan. 2001, online, retrieved on May 12, 2006, from <URL: http://rfc.net/rfc3022.html>.

Trend Communications, "RFC 2544 Testing with Aurora Tango", date unknown, online, retrieved on May 12, 2006, from <URL: http://www.trendtest.co.uk/trendweb/resource.nsf/vlFileURL-Lookup/en%5E%5ERFC+2544+testing/$FILE/GbEnet.2544.test.pdf>.

Udupa, R. et al., "Performance Issues and Evaluation Techniques for Networking Devices", 2001, online, retrieved on May 12, 2006, from URL: http://softwarediodide.com/Channels/events/testing2001/Presentations/raghavendra_infosys.pdf>.

PCT International Search Report and Written Opinion, PCT/US06/09512, Aug. 31, 2006.

Wikipedia.com, Active Directory, http://en.wikipedia.org/wiki/Tunneling_protocol, Nov. 16, 2007.

Wikipedia.com, Active Directory, http://en.wikipedia.org/wiki/Session_initiation, Nov. 16, 2007.

Gordano.com, What is the SMTP/EHLO clause, Nov. 16, 2007.

* cited by examiner

AMERICAN POWER CONVERSION CORP Apple Computer Apple Computer Inc. Apple Computers Apple, Inc. Apple, Inc. APPLE,INC Cisco Systems Cisco-Linksys LLC Compal Electronics,INC. D-Link Corporation Dell Dell Inc Dell Inc. Fortinet Inc. FUJI-XEROXCO.LTD. Intel Corporate Intel Corporation Interface Masters, Inc IWILL CORPORATION Juniper Networks Juniper Networks, Inc. LANNER ELECTRONICS, INC. SAMSUNG ELECTRONICS CO.,LTD. Sonicwall Supermicro Computer, Inc. TEKNORMICROSYSTEME,INC. TiMetraNetworks TYANCOMPUTERCORP. USI VMware, Inc. WiDeFi,Inc.

*FIG. 5* search: it it-vml
it-vml.musecurity.com
it-vml.musecurity.com esmtp postfix (debian/gnu)
itbackupexec
itfiler
itfiler.musecurity.com
ithelpdesk
ithelpdesk microsoft esmtp mail service, version: 6.0.3790.3959
itprinters
itsql2005-01

FIG. 6

| apps | servers | hosts | services | new for you |
|---|---|---|---|---|
| Mu Dynamics – Mu-4000 Service Analyzer | | | | ▭ 58 |
| Mu Security Mu-4000 :: Security Analyzer | | | | ▫ 8 |
| Login | | | | ▫ 7 |
| Mu Dynamics – Mu Service Analyzer | | | | ▫ 6 |
| Index of / | | | | ▫ 5 |
| Under Construction | | | | ▫ 4 |
| Test Page for Apache Installation | | | | ▫ 4 |
| Apache Tomcat/5.5.20 | | | | ▫ 2 |
| Home | | | | ▫ 2 |
| Secure Portal | | | | ▫ 2 |
| System Setup – Mu-4000 Service Analyzer | | | | ▫ 2 |
| Sonic WALL – Authentication | | | | ▫ 2 |
| Sessions: New | | | | ▫ 2 |
| Welcome page | | | | ▫ 2 |
| CruiseControl at clyde | | | | ▫ 2 |
| Other... | | | | ▭ 15 |

*FIG. 7*

SYSTEM AND METHOD FOR DISCOVERING ASSETS AND FUNCTIONAL RELATIONSHIPS IN A NETWORK

CROSS-REFERENCE TO RELATED APPLICATIONS

The present invention is related to U.S. Utility patent application Ser. No. 12/234,450, filed Sep. 19, 2008, U.S. Utility patent application Ser. No. 11/514,809, filed Sep. 1, 2006, and U.S. Utility application Ser. No. 11/760,600, filed Jun. 8, 2007, all of which are hereby incorporated by reference in their entirety.

BACKGROUND

1. Field of Art

The present invention generally relates to the field of system management, in particular to information technology (IT) assets and services discovery, IT search, and change management.

2. Description of the Related Art

A network typically includes a variety of interconnected component systems (also referred to as component systems, network/service elements). Each of the component systems provides one or more services and works together with the rest to collectively provide aggregate services to users. For example, in Voice Over IP service (VoIP), session border controllers work in conjunction with gateways, phones, billing systems, Domain Name System (DNS) servers, Remote Authentication Dial In User Service (RADIUS)/Lightweight Directory Access Protocol (LDAP) authentication servers, and underlying IP infrastructure, to constantly validate and ensure that phones can be registered, that phone calls can be made, that the caller is authenticated, and that the phone calls are billed properly.

Because component systems can be added, removed, and changed (e.g., reconfiguration, patching, upgrading) overtime, the landscape of a network evolves overtime. In addition, because of the interdependent nature of the component systems, changes made in one component system (e.g., configuration changes) can inadvertently affect other component systems dependent upon it. The unintended impact can cause inter-component dependencies to breakdown and thereby break the service. Therefore, it is important to track the component systems and their status and functional relationships.

Traditional best practice techniques of managing hosts on a network and their configurations are summarized in the Information Technology Infrastructure Library (ITIL). In the context of asset management, such technologies mostly revolve around node-based views of the network. Tremendous efforts have gone in to enumerate and list out what's on the network and when it was provisioned. Unfortunately, such efforts have mostly resulted in a static spreadsheet view of the network that has to be manually updated. This is not only laborious, but also error prone. In the context of change management, such technologies mostly revolve around Simple Network Management Protocol (SNMP) based monitoring, log-based management-by-exception, and Change Management DataBase (or Configuration Management DataBase, CMDB). SNMP-based monitoring provides a large amount of details without revealing the configuration and supported services of the underlying component system. Log management records what has happened in the underlying component system without revealing the actual impacts or the causes. CMDB typically involves a spreadsheet for network operators to track configuration changes manually, which is both tedious and error prone. In addition, the traditional way of enumerating applications within known hosts involves installing agents in each of the known hosts which further explore and discover applications, file systems and other aspects internal to the host. This approach is defective because installing agents on hosts are intrusive and can potentially destabilize the hosts.

Therefore, there is a need for a system and method for automatically discovering network components and their statuses and functional relationships in real time.

SUMMARY

The present invention overcomes limitations of the prior art by providing a discovery system (and corresponding method and computer program product) for discovering assets and functional relationships among the assets in a network system. In one embodiment, the discovery system executes protocol queries against the network system. The discovery system contextually analyzes query responses for determining references to assets in the network system and their roles and functional relationships based on corresponding protocol grammars. The discovery system determines queries associated with the newly discovered assets based on their roles and functional relationships, and recursively applies the above process to the newly discovered assets to discover additional assets and their roles and functional relationships.

In one aspect of the present invention, the discovery system is scheduled to periodically interrogate assets for up-to-date information of the assets and functional relationships among the assets. Such information can be indexed and searched.

Other aspects of the disclosure include software, systems, components, and methods corresponding to the above, and applications of the above for other purposes.

BRIEF DESCRIPTION OF THE DRAWINGS

The disclosure is illustrated by way of example, and not by way of limitation, in the figures of the accompanying drawings in which like reference numerals refer to similar elements.

DETAILED DESCRIPTION

The present invention describes a methodology and corresponding system and computer program product to discover assets in a network system and their roles, statuses, and associations (also called functional relationships) with each other. An asset is defined as an entity that supports one or more protocols, such as a network, a physical host, a service that runs on the host as well as virtual hosts.

According to one aspect of the present invention, a seed asset in a network system and its supporting protocol commands are represented by a seed object and associated methods. The methods of the seed object are invoked to interrogate the seed asset. The responding messages from the corresponding seed asset is normalized into Document Object Models (DOMs) and contextually analyzed to identify references to other assets, their roles and functional relationships with the queried asset. The identified assets are represented by objects. Protocol commands supported by the identified assets are represented by methods associated with the corresponding objects and invoked for responses. The responses are then normalized and analyzed for further assets. This process can be recursively applied to newly discovered assets to discover additional assets available in the network system and their roles and functional relationships. This process can also be applied continuously by a discovery system to make multiple periodical passes of the assets to extract real time status and functional relationship information.

The discovered information can be used to construct a network functional topology map, and to provide advanced services such as searches, change management, and customizable advanced visualization. This map beneficially identifies functional relationships between services and hosts that are closely relevant in troubleshooting and diagnosing service-related problems. This map is one layer above physical connectivity that, while interesting, masks the complex service-level dependencies in most modern networks.

Protocol Normalization and Message Abstraction (DOM)

Communications among computing devices generally involve the exchange of data or messages in a known, structured format (a "protocol"). Typically a computing device supports one or more protocols by implementing them in software or hardware modules within the device. Each of these protocols can be described by a concrete formal grammar (e.g., a context-free grammar) through a process called normalization (also known as canonization). The grammar can be represented by a generic data structure, and can be used to generate and verify protocol messages. Further information regarding normalization and representing protocols using a generic data structure is found in U.S. application Ser. No. 11/514,809, filed Sep. 1, 2006, titled "Automated Generation of Attacks for Analyzing the Security of Communication Protocols and Channels", the content of which is incorporated by reference in its entirety.

A protocol typically includes one or more messages (or commands). A protocol message can be expressed as a method call, with its fields represented by parameters of the method call. Similarly, a responding protocol message can be expressed using markup language such as the Extensible Markup Language (XML) and stored in a normalized document object model (DOM). Responding protocol messages can be parsed according to the corresponding protocol grammar. The parsing result can be expressed in XML and stored in the DOM. Further information regarding protocol message representation and normalization is found in U.S. application Ser. No. 12/234,450, filed Sep. 19, 2008, titled "Test Driven Deployment And Monitoring Of Heterogeneous Network Systems", the content of which is incorporated by reference in its entirety. As a result of the normalization process, the complexity of the protocol communication (e.g., layers of communication protocols used in the actual transmission) is hidden behind the method call and the returned canonical DOM.

A responding protocol message typically includes information of interest. For example, a message responding to an inquiry about a digital certificate contains information regarding when the digital certificate expires. Such information can be stored and indexed for subsequent searches, and used for testing purposes. A responding protocol message often contains information referencing other devices, hosts, and/or services (collectively referred to assets) available in the network. For example, in response to a received DHCPREQUEST message, a DHCP (Dynamic Host Configuration Protocol) server returns a DHCP Acknowledgement message identifying itself as the DHCP server. The DHCP Acknowledgment message may also contain information such as information about local DNS (Domain Name System) server(s) (e.g., its IP (Internet Protocol) address). Such reference information can be identified using protocol grammars, generic data structures, and/or contextual information in the responding message (e.g., associated tagging information).

The reference information extracted from responding messages can be used to discover other assets available in the network and their roles and functional relationships with the queried asset. The assets identified by the reference information can be interrogated for further reference information identifying additional assets. This process can be recursively applied to discover assets in the network and their roles and functional relationships (or associations, logical correlations). A system that utilizes the process to discover assets and functional relationships among assets is described in detail below.

Computing Environment

Figure 1:
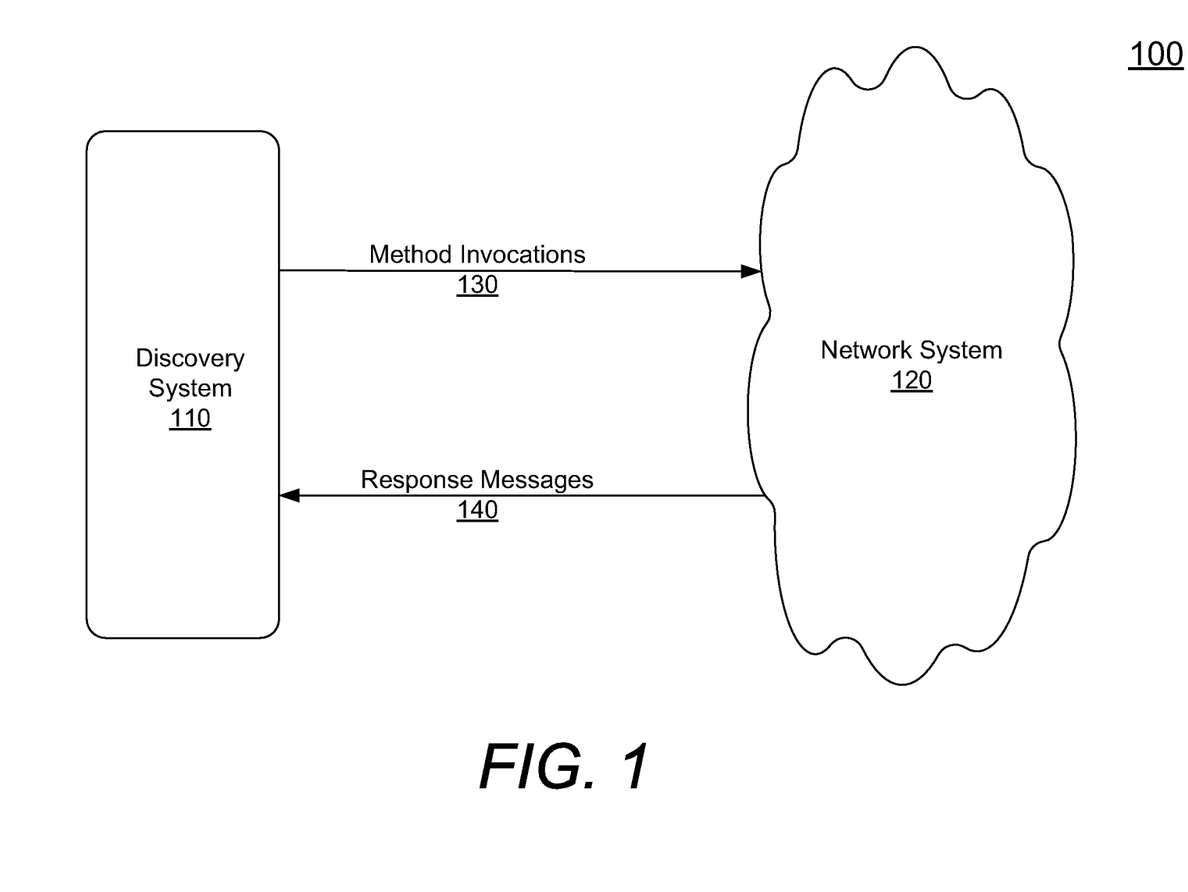
FIG. 1 is a block diagram illustrating a computing environment for discovering assets and their roles and functional relationships in a network system according to one embodiment of the present invention.

FIG. 1 is a high-level block diagram of a computing environment 100 for discovering assets and their roles and functional relationships in a network system according to one embodiment of the present invention. The computing environment 100 includes a discovery system 110 and a network system 120 communicatively connected together. The network system 120 includes interconnected, interdependent, component systems. The discovery system 110 can also connect to network systems other than the network system 120 (not shown).

The discovery system 110 (also referred to as crawler system, service crawler, crawler) is configured to discover assets and their roles and functional relationships in the network system 120. The discovery system 110 is configured to conduct the discovery by recursively interrogating known assets (e.g., seed assets, discovered assets) though method invocations 130 for response messages 140, and contextually analyzing the response messages 140 for references to other assets (also referred to as hyperlinks). Alternatively or in conjunction, the discovery system 110 is configured to continuously interrogate known assets to detect changes (e.g., changes in roles, configurations, and functional relationships) in the network system 120.

The discovery system 110 can be implemented in hardware, software, or a combination of both. Regarding software, the discovery system 110 can be, for example, a single application (executing within a single operating system or single physical device) or a collection of applications communicating with each other to correlate discovery operations. Regarding hardware, the discovery system 110 can be, for example, a standalone computer or a collection of physical devices with out-of-band synchronization. In one embodiment, the discovery system 110 is a portable appliance that can be transported to different locations to conduct discovery in different network systems.

The network system 120 includes multiple assets (not shown). An asset is an entity that supports one or more protocols, each of which including one or more protocol commands (or functions, methods). When invoked thorough one of such supported protocol function calls, the asset returns one or more responding messages. Each of the assets includes hardware and/or software subject to discovery. Software includes, for example, services, interfaces, domains, applications, operating systems, and/or communications systems. Hardware includes, for example, one or more devices. A device can be, for example, a server, host, subnet, switch, bridge, router, packet filter, firewall, Virtual Private Network (VPN) concentrator, proxy, intrusion detection/prevention system, or network protocol analyzer. An asset (e.g., a subnet) can include multiple devices that are coupled at various communication layers to form a system or network of devices. Each of the component devices can in turn be an asset. The assets communicate with each other through networks such as the Internet, an intranet, a wireless local area network (LAN), a cellular network, or any combination thereof. The assets receive the method invocations 130 from the discovery system 110 and respond by sending the response messages 140.

In one embodiment, the discovery system 110 and/or assets in the network system 120 (or computer systems executing the discovery system 110 and/or assets) are structured to include a processor, memory, storage, network interfaces, and applicable operating system and other functional software (e.g., network drivers, communication protocols).

A system architecture of the discovery system 110 is discussed below according to one embodiment of the present invention.

System Architecture of Discovery System

Figure 2:
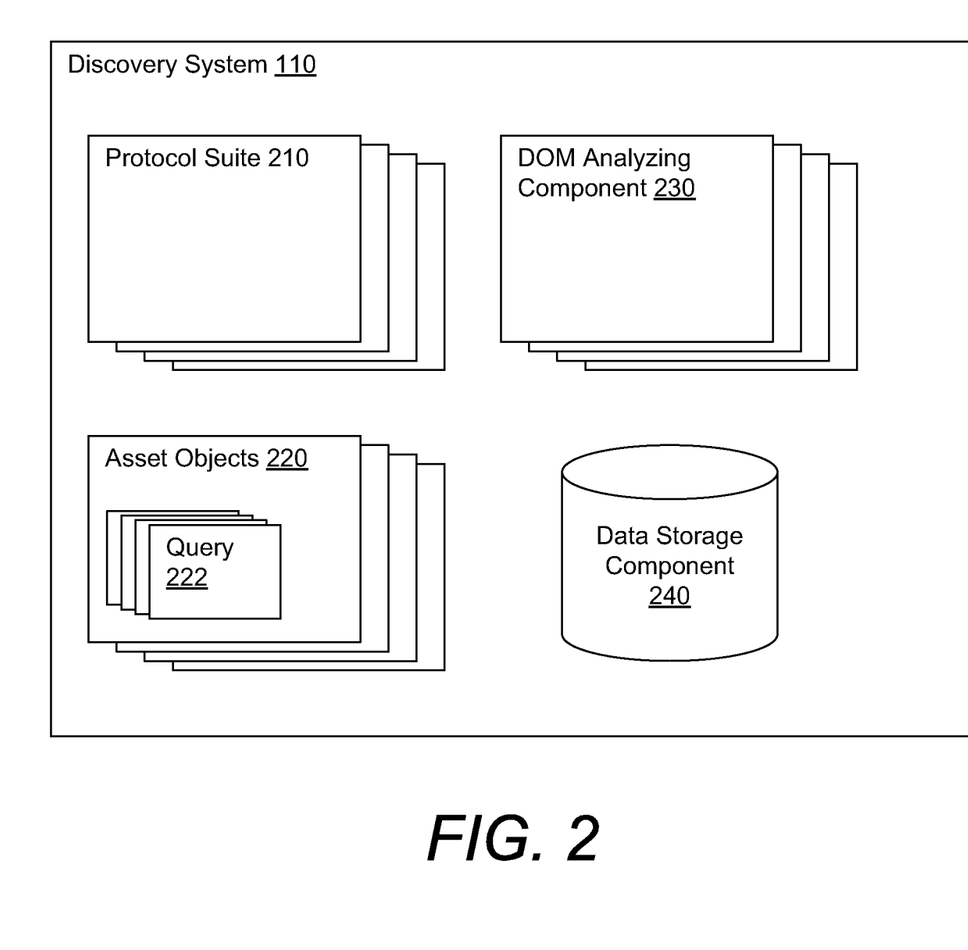
FIG. 2 is a block diagram illustrating a system architecture of a discovery system shown in FIG. 1 according to one embodiment of the present invention.

FIG. 2 is a block diagram illustrating a system architecture of the discovery system 110 shown in FIG. 1 according to one embodiment of the present invention. As shown, the discovery system 110 includes multiple protocol suites 210, multiple asset objects 220, each including one or more queries 222, multiple DOM analyzing components 230, and a data storage component 240. The discovery system 110 can also include other components, such as an index engine and a search engine (not shown) for indexing and searching information received from the discovered assets, and a protocol engine (not shown) for parsing and/or normalizing (or canonizing) queries, protocols, and protocol messages.

A protocol suite 210 is a parameterized atomic protocol command (or transaction, method, function) for a protocol. A protocol suite 210 is a method call where arguments (or parameters) are defined but the actual values for the arguments are not known. For example, DNS requests can be represented by the following protocol suite:

DNS.query(target-ip, query-name, query-type, query-class)

As shown, the above protocol suite can be customized to query various different aspects of the DNS (e.g., A record, CNAME record, Zone transfer, SOA record). As another example, HTTP (Hypertext Transfer Protocol) requests can be represented by an HTTP protocol suite that takes URL and SSL setting as arguments. The discovery system 110 can be pre-configured with a set of basic protocol suites 210 for well established protocols (e.g., HTTP, DNS). The discovery system 110 can also dynamically add new protocol suites 210 into its collection. For example, the discovery system 110 can discover protocols (and/or commands) supported by an asset through techniques such as Representational State Transfer (REST), Web Services Description Language (WSDL), Simple Object Access Protocol (SOAP), and Universal Description, Discovery and Integration (UDDI), and create new protocol suites 210 for such newly discovered protocol commands.

An asset object 220 is an object representing a known asset (e.g., a seed asset or a discovered asset) in the network system 120. Initially the discovery system 110 may only have one or a few asset objects 220 (hereinafter referred to as seed objects). The discovery system 110 discovers other assets through recursively interrogating known assets, contextually analyzing the query responses for additional assets, and then interrogating the additional assets at run-time.

As illustrated, each asset object 220 has one or more queries 222. A query 222 represents a configured protocol suite where the customizable parameters of the underlying protocol suite 210 are defined and specified. Because parameters of a protocol suite 210 can take various values, a single protocol suite 210 can be associated with multiple queries 222, each having a same or different configuration. For example, the DNS request protocol suite 210 illustrated above may have numerous queries 222 associated with various IP addresses, such as the following query 222 soliciting information about the uspto.gov domain:

DNS.query (www.uspto.gov)

The value of the parameters can be determined on the fly. For example, the value of the IP address argument of the DNS request protocol suite 210 can be extracted from a response message of the queried asset.

In one embodiment, objects of certain types of assets have a set of default queries. For example, objects for network components (e.g., hosting computers) by default include a TCP scan query and a UDP scan query. The TCP scan query enumerates through potentially available TCP ports and attempts to communicate with the interrogated network component to discover its supported protocols and assets resided within. Similarly, the UDP scan query attempts to interrogate though potential UDP ports for discovery. Based on the discovery result, the discovery system 110 creates new asset objects 220 and attaches new asset specific queries 222 accordingly. For example, after finding out that a web server supports several services through TCP port 80, the discovery system 110 can create objects 220 for the newly discovered services, and attach service-specific queries 222 of the newly created objects 220 to that port.

The DOM analyzing component 230 (also referred to as spider) is configured to contextually analyze query results to discover references to other assets (also referred to as hyperlinks) and the functional relationships between the queried asset and the other assets. The DOM analyzing component 230 also generates new asset objects 220 for the discovered assets and associated new queries 222 based on the roles and functional relationships of the discovered assets. Responding messages 140 from assets are canonical, normalized DOMs, structured data containing salient portions of the underlying protocol exchanges. Therefore, the context and structure of the DOMs is determined by the underlying protocols. In one embodiment, the discovery system 110 creates a DOM analyzing component 230 for each protocol suite 210 and configures the DOM analyzing component 230 to specially handle the associated query results.

The following is a DOM for a query result of a DNS request. The example DOM is represented using the JavaScript Object Notation (JSON) format, even though other formats (e.g., XML) can also be used.

```
{"status"=>:NOERR,
    "questions"=>[{"qname"=>"ldap.musecurity.com",
"qtype"=>:A, "qclass"=>:IN}],
    "answers"=>
        [{"label"=>"ldap.musecurity.com",
"cname"=>"stan.musecurity.com"},
            {"label"=>"stan.musecurity.com", "a"=>"10.10.3.1"}],
    "authorities"=>
        [{"label"=>"musecurity.com",
"ns"=>"themole.musecurity.com"},
            {"label"=>"musecurity.com",
"ns"=>"kyle.musecurity.com"}],
    "additional"=>
        [{"label"=>"kyle.musecurity.com", "a"=>"74.85.18.162"},
            {"label"=>"themole.musecurity.com",
"a"=>"10.10.3.110"}]}
```

The above example DOM shows that querying a DNS server for ldap.musecurity.com returns references to three servers named themole, kyle, and stan as well as their IP (Internet Protocol) addresses. As a result, the DOM analyzing component 230 creates three asset objects 220 and associated LDAP (Lightweight Directory Access Protocol) specific queries 222 for the three newly discovered servers.

As another example, the resulting DOM of a query for mount points in the Host Resource Management Information Base (Host Resource MIB) using SNMP (Simple Network Management Protocol) includes the following information:

```
{"mounts"=>
    [{"host"=>"bertha", "path"=>"/amanda"},
        {"host"=>"bertha", "path"=>"/mu"},
        {"host"=>"clyde", "path"=>"/home/build/cruise"}]}
```

As shown, the queried host returns references to two other hosts named bertha and clyde. Based on the underlying protocol (Host Resource MIB) and the semantic of the resulting DOM, the DOM analyzing component 230 determines that the host that was queried is mounting different file systems from bertha and clyde, and thus discovers the functional relationships between the queried host and the newly discovered hosts and their roles in the relationships. Thus, by contextually analyzing the resulting DOMs, the DOM analyzing component 230 can identify hyperlinks to additional assets, discover information about the additional assets (e.g., their roles, types, and IP addresses), determine their functional relationship with the queried asset, and create asset objects 220 and queries 222 accordingly.

In addition, the above example shows that the functional relationship identified through executing a query 222 of a protocol is not necessarily tied to the query protocol. In this example, the query protocol is SNMP, and the queried asset and the identified systems (remote mount points) are connected through the Host Resource MIB (or the Network File System). SNMP is a means for the discovery system 110 to discover the remote mount points and does not impose any restriction on the underlying functional relationships. Because the DOM analyzing component 230 associated with the SNMP query is configured with knowledge of the protocol grammar, it can accurately identify the remote mount points and their roles and functional relationships with the queried asset.

The data storage component 240 is configured to store information related to the discovery process of the discovery system 110. Examples of such information include protocol grammars (e.g., supported protocol commands), discovered assets (e.g., information extracted from responses from the assets, DOMs), their roles and functional relationships (e.g., hyperlinks and associated information). The data storage component 240 may be a relational database or any other type of database that stores the data, such as a flat file.

Because inquiries to known assets are expressed as queries 222, the query results are represented by DOMs and contextually analyzed for references to other assets, an analogy can be made between web pages and DOMs, and between hyperlinks in the web pages and asset references in the DOMs. Therefore, spidering technologies can be applied to crawl the network to discover available assets.

A methodology for the discovery system 110 to recursively interrogate known assets to discover additional assets and their roles and functional relationships is described in detail below.

Asset and Functional Relationship Discovery Methodology

Figure 3:
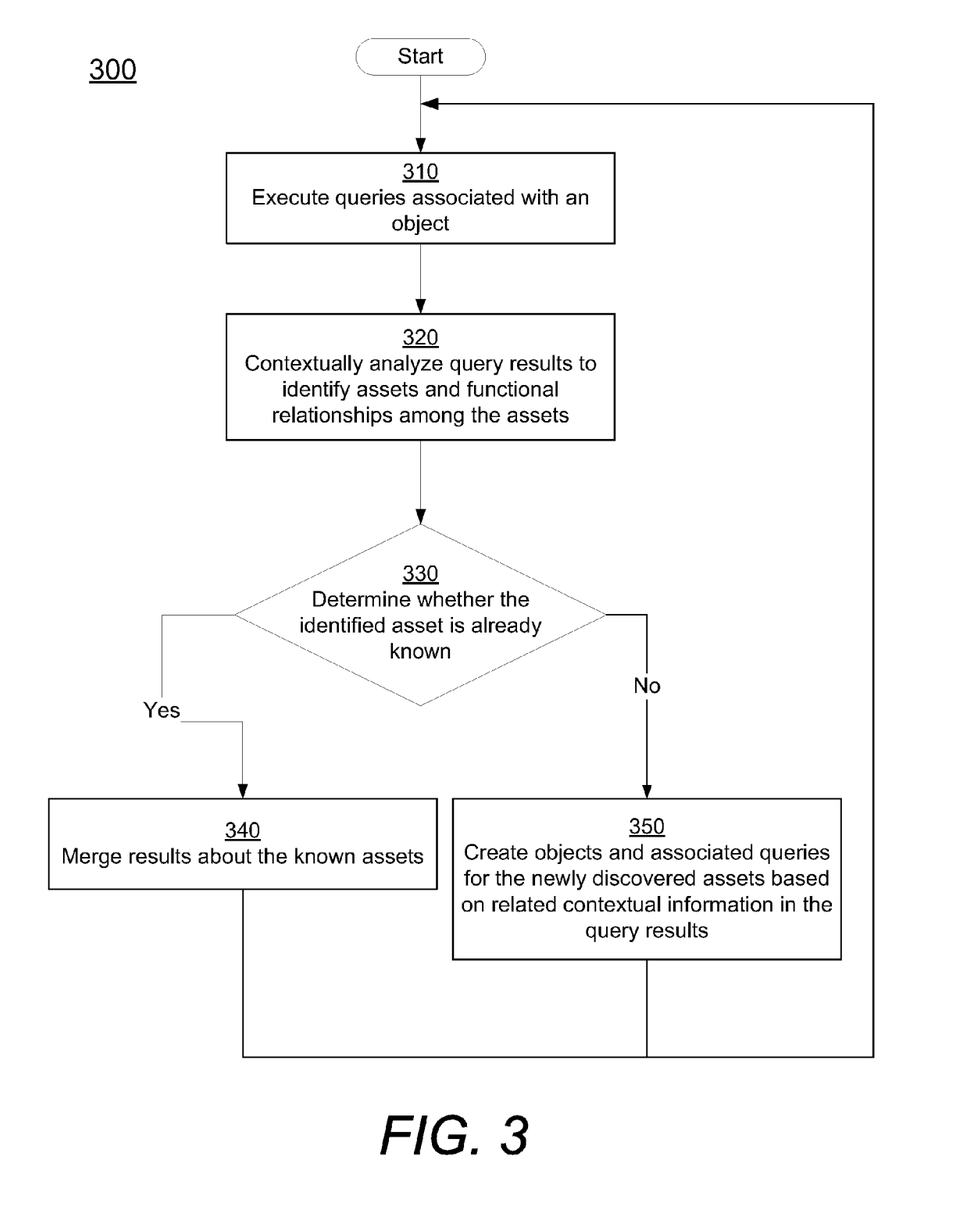
FIG. 3 is a flowchart of an exemplary method of a discovery system shown in FIG. 1 according to one embodiment of the present invention.

FIG. 3 is a flowchart of an exemplary method 300 of the discovery system 110 according to one embodiment of the present invention. In this example, the discovery system 110 operates to discover assets and their roles and functional relationships in the network system 120. One or more portions of the method 300 may be implemented in embodiments of hardware and/or software or combinations thereof. For example, the method 300 may be embodied through executable instructions for performing the actions described herein and such instrumentations can be stored within a tangible computer readable medium (e.g., flash memory, RAM) and are executable by a processor. Furthermore, those of skill in the art will recognize that other embodiments can perform the steps of the method 300 in different order. Moreover, other embodiments can include different and/or additional steps than the ones described here. The discovery system 110 can perform multiple instances of the steps of the method 300 concurrently and/or perform steps in parallel.

The discovery system 110 coordinates the DOM analyzing components 230 to discover assets and their roles and functional relationships in the network system 120. Initially, the discovery system 110 has one or a few seed objects representing known assets (also referred to as seed assets). Examples of such seed assets include a local network interface, and hosts associated with a specific range of IP addresses. The seed object(s) can be pre-configured with the discovery system 110 or provided by users.

The discovery system 110 (or the DOM analyzing component 230) executes 310 queries 222 associated with a seed object by transmitting the corresponding protocol messages to the corresponding seed asset. The responding messages from the seed asset are normalized into DOMs and passed on to the DOM analyzing component 230 corresponding to the executed queries 222. The DOM analyzing component 230 contextually analyzes 320 the DOMs to identify hyperlinks to other assets and determine their roles and functional relationships. The DOM analyzing component 230 determines 330 whether the identified assets are already known to the discovery system 110 (e.g., represented by an asset object 220). If an identified asset is already known to the discovery system 110, the DOM analyzing component 230 merges 340 the results (e.g., by storing information about the asset together). Otherwise, the DOM analyzing component 230 creates 350 an asset object 220 and associated queries 222 for the asset based on the relevant contextual information in the DOM. Information about the DOM, the functional relationships, and the identified assets are also stored in a persistent data store (e.g., the data storage component 240).

The discovery system 110 (or the DOM analyzing component 230) subsequently executes 310 queries 222 associated with newly created asset objects 220 (or newly created queries 222 for existing asset objects 220), and passes on the query results to the corresponding DOM analyzing components 230 for contextual analysis 320. The method 300 can be applied recursively to newly created asset objects 220 and/or queries 222 to discover assets and their roles and functional relationships in the network system 120. In one embodiment, the asset objects 220 (or the queries 222) are placed in a data structure such as a queue and a stack. The discovery system 110 retrieves asset objects 220 from the queue to execute 310 associated queries 222, and adds to the queue newly created asset objects 220 representing assets discovered in results of the queries 222. The discovery system 110 can repeat the process until the queue becomes empty. This process of recursively applying the method 300 is also referred to as crawling.

In one embodiment, the discovery system 110 periodically crawls through the network system 120, and stores resulting information of the assets in the data storage component 240. Assuming the assets in the data store is retrievable by the last-updated time stamp, the discovery system 110 can interrogate one known asset at a time by executing all queries for the asset and merging the resulting changes back into the data storage component 240. Each pass either discovers new assets or new queries or generates change records that identify exactly which part of the known asset was changed and how. By having the normalized query results from all known assets in the data storage component 240 continuously updated by the discovery system 110, a real-time snapshot of the network system 120 including all known assets and their roles and functional relationships can be constructed. As will be described in further detail below, such information can be used to provide various advanced services to users that are unavailable before.

The method 300 is further illustrated through the following example. Assume the discovery system 110 has a seed asset object 210 representing a network interface. The seed object 210 is associated with the following default queries: arp-enum, dhcp-discover, icmp-broadcast-ping, and ssdp-search. The arp-enum query uses ARP (Address Resolution Protocol) to methodically query for all hosts in the subnet connected to the network interface. The dhcp-discover query searches for the existence of DHCP servers on the network. The icmp-broadcast-ping query sends a broadcast ICMP (Internet Control Message Protocol) packet to the network and collects responses from the responding hosts in the network. The ssdp-search query sends an SSDP (Simple Service Discovery Protocol) multicast request to identify all UPnP (Universal Plug and Play) devices (e.g., printers) in the network.

The discovery system 110 places the seed object into a queue (the only object in the queue) and initiates the method 300. The discovery system 110 retrieves the seed object from the queue and executes 310 associated queries by issuing corresponding query messages to the network interface. The network interface broadcasts (or multicasts) the protocol messages. As a result, hosts in the network connected to the network interface receive the protocol messages and respond by sending query results to the discovery system 110 (through the network interface). The query results are normalized into DOMs and passed to corresponding DOM analyzing components 230 for contextual analysis 320.

The following is an example DOM of a response message from a DHCP server for the dhcp-discover query the discovery system 110:

```
{"type"=>"service",
 "queries"=>
    [{"name"=>"dhcp:discover",
```

"category"=>"auto",
"klass"=>"Mumon::Query::DHCP::API::Discover",
"config"=>{ },
"result"=>
    {"siaddr"=>"10.10.3.110",
     "shaddr"=>"00:18:8b:35:97:8a",
     "yiaddr"=>"10.10.1.3",
     "yimask"=>"255.255.248.0",
     "domain"=>"musecurity.com",
     "vendor"=>nil,
     "servers"=>
        [{"type"=>"dns", "ip"=>"10.10.3.80"},
         {"type"=>"dns", "ip"=>"10.10.3.110"},
         {"type"=>"lpr", "ip"=>"10.10.3.110"},
         {"type"=>"nbns", "ip"=>"10.10.3.110"},
         {"type"=>"ntp", "ip"=>"10.10.3.110"},
         {"type"=>"router", "ip"=>"10.10.0.1"},
         {"type"=>"tftp", "ip"=>"10.10.3.110"}]},
     "links"=>["host:10.10.0.1", "host:10.10.3.80",
"service:10.10.3.80:dns"]}],
"name"=>"dhcp",
"host"=>"10.10.3.110",
"banner"=>nil,
"enabled"=>true}

As shown, the DOM includes information (e.g., IP addresses) about two DNS servers, one LPR (Line Print Request) server, one NBNS (NetBIOS Naming Service) server, one NTP (Network Time Protocol) server, one router, and one TFTP (Trivial File Transfer Protocol) server, along with other assets such as the domain (musecurity.com), and information about the DHCP server itself. The DOM analyzing component 230 associated with the DHCPREQUEST protocol suite (also known as DHCP API Discovery) contextually analyzes 320 the DOM and identifies hyperlinks (or references) to the various assets. The DOM analyzing component 230 determines 330 whether the identified assets are already known. Since at this point the discovery system 110 is only aware of the network interface (the seed asset), all the identified assets are unknown. As a result, the DOM analyzing component 230 creates 350 objects and associated queries for each of the identified assets, and places them in the queue. For example, based on the context of the DOM (e.g., the tag "type"=>"dns"), the DOM analyzing component 230 determines that the assets at the IP addresses 10.10.3.80 and 10.10.3.110 are DNS servers for the queried asset, the network interface, and creates objects for them and queries that are specific for DNS servers, such as a DNS Request query. In addition, the DOM analyzing component 230 stores the DOM and the extracted information (e.g., the functional relationships) in the data storage component 240. It is noted that the host with the IP address 10.10.3.110 plays the following roles: a DNS server, an LPR server, a NBNS server, a DHCP server, an NTP server, and a TFTP server. In one embodiment, each of the roles (or functions, services) is identified as a separate asset that is represented by a distinctive asset object 220. In other embodiments, the host can be represented by a single asset object 220 associated with queries for each of these services provided by the host. In one embodiment the queries associated with the newly created objects are created based on the relevant contextual information (e.g., DNS related queries for DNS server assets). In other embodiments, an asset may be associated with context neutral queries (e.g., TCP san and/or UDP scan).

After processing the queries for the seed asset, the discovery system 110 repeats the above process for other objects in the queue. For example, the discovery system 110 can retrieve the asset object 220 representing one of the two newly discovered DNS servers, and executes 310 the associated queries. The responding messages are normalized to DOMs. The following is an example DOM for a DNS request with two different queries. One of the two queries fetches the SOA (source of authority) resource record, and the other queries for the SMTP server (MX resource record).

```
{"type"=>"service",
   "queries"=>
      [{"name"=>"dns:mx:lookup",
         "category"=>"auto",
         "klass"=>"Mumon::Query::DNS::API::Query",
         "config"=>{"qtype"=>"MX", "qname"=>"musecurity.com"},
         "result"=>
            {"status"=>"NOERR",
               "questions"=>
                  [{"qname"=>"musecurity.com", "qtype"=>"MX",
"qclass"=>"IN"}],
               "answers"=>
                  [{"label"=>"musecurity.com",
                     "mx"=>{"preference"=>10,
"exchange"=>"pip.musecurity.com"}}],
               "authorities"=>
                  [{"label"=>"musecurity.com",
"ns"=>"themole.musecurity.com"},
                     {"label"=>"musecurity.com",
"ns"=>"kyle.musecurity.com"}],
               "additional"=>
                  [{"label"=>"kyle.musecurity.com",
"a"=>"74.85.18.162"},
                     {"label"=>"pip.musecurity.com", "a"=>"10.10.3.90"},
                     {"label"=>"themole.musecurity.com",
"a"=>"10.10.3.110"}]},
         "links"=>
            ["host:10.10.3.90",
               "host:74.85.18.162",
               "service:10.10.3.90:smtp",
               "service:74.85.18.162:dns"]},
      {"name"=>"dns:soa:lookup",
         "category"=>"auto",
         "klass"=>"Mumon::Query::DNS::API::Query",
         "config"=>{"qtype"=>"SOA", "qname"=>"musecurity.com"},
         "result"=>
            {"status"=>"NOERR",
               "questions"=>
                  [{"qname"=>"musecurity.com", "qtype"=>"SOA",
"qclass"=>"IN"}],
               "answers"=>
                  [{"label"=>"musecurity.com",
                     "soa"=>
                        {"mname"=>"kyle.musecurity.com",
                           "rname"=>"admin@musecurity.com",
                           "serial"=>2008090802}}],
               "authorities"=>
                  [{"label"=>"musecurity.com",
"ns"=>"themole.musecurity.com"},
                     {"label"=>"musecurity.com",
"ns"=>"kyle.musecurity.com"}],
               "additional"=>
                  [{"label"=>"kyle.musecurity.com",
"a"=>"74.85.18.162"},
                     {"label"=>"themole.musecurity.com",
"a"=>"10.10.3.110"}]},
         "links"=>
            ["host:74.85.18.162",
               "service:74.85.18.162:dns"]}],
   "name"=>"dns",
   "host"=>"10.10.3.110",
   "banner"=>nil,
   "enabled"=>true}
```

As shown, the results of both queries include contextual information that identifies additional assets. As a result, the DOM analyzing component 230 associated with the DNS request protocol suite 210 identifies these assets and their roles and functional relationships, creates new objects 220 and associated queries 222, places the new objects 220 in the queue, and stores the results in the data storage component 240.

As shown, by recursively applying the method 300, the discovery system 110 can discover assets in the network system 120 and their roles and functional relationships by following hyperlinks identified in normalized query results. In addition, by repeatedly crawl through the network system 120, the discovery system 110 can maintain a constantly updated database of information regarding the network system 120, the assets within, and their roles and functional relationships. As described below in further detail, the data collected through method 300 can be used to provide advanced user services (or functions).

Starting with the network interface as the seed asset, the discovery system 110 could potentially identify hosts that are outside the subnet range of the network interface or the network range(s) specified by users. In one embodiment, as new hosts are identified, the discovery system 110 can be configured to automatically compare the IP addresses of the newly identified hosts against these ranges to ensure that the discovery system 110 does not leak out into the Internet. Information about such outside assets and their functional relationships can be indexed such that users can query against assets that are outside their realms of control.

Example Usage of Collected Data

As described above, the discovery system 110 can discover new assets and their roles and functional relationships, along other important information about the assets by interrogating known assets (e.g., seed assets, discovered assets). In addition, the discovery system 110 can keep such information up-to-date through automatic continuous crawling. As a result, the discovery system 110 is aware of everything on the network and their configuration (or available services), and how things are actually correlated between each other. This information can be utilized to provide user services. The following are a few examples.

A. Visualization and Data Mining

The updated asset data can be used to provide various visibilities about the network system. For example, the asset data can be used to construct a real-time functional map of all known assets in the network system 120 with new assets added as they are discovered in real time. The functional map identifies assets by their roles and connects assets through their functional relationships. The functional graph not only identifies related assets but also specifies exactly their roles and how they are related. This functional graph is useful for purposes such as determining impact radius of a certain asset in the network system 120.

Figure 4A:
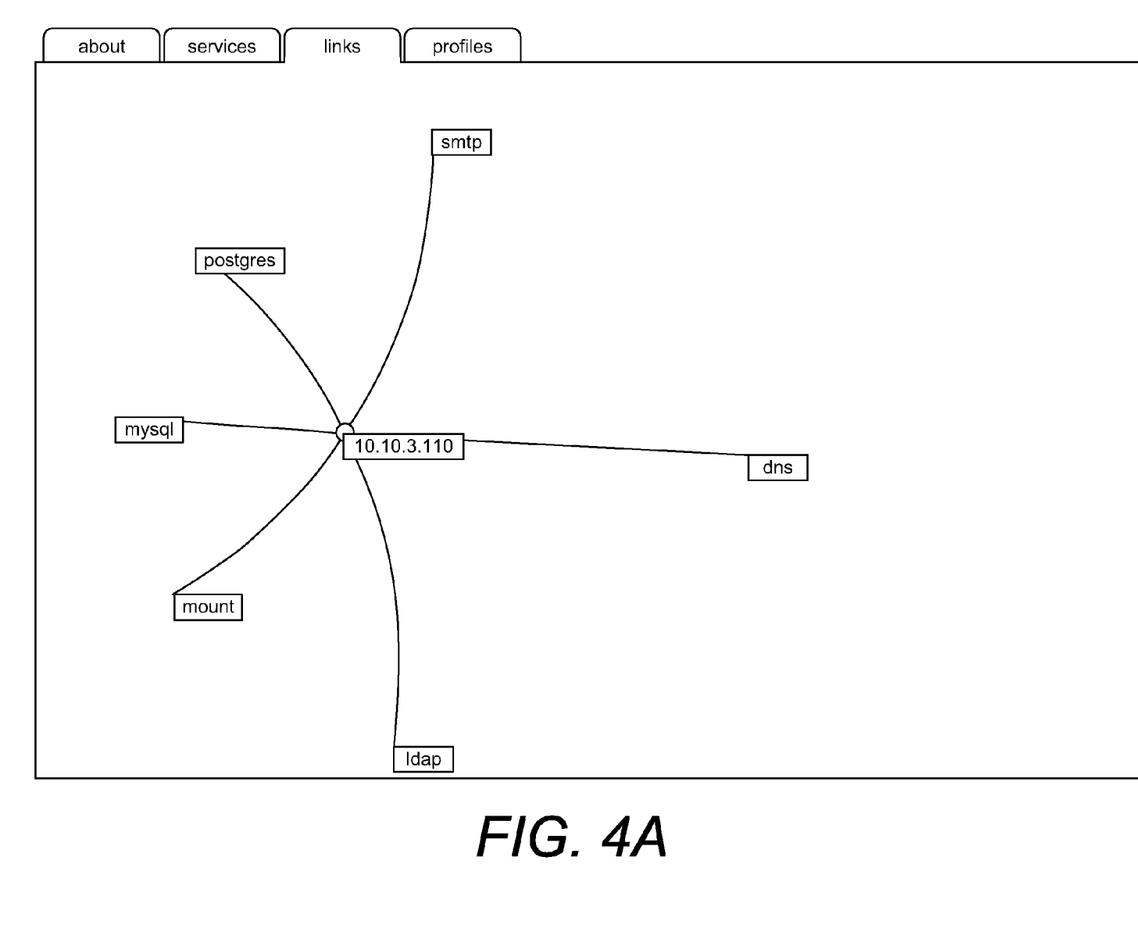
FIGS. 4A and 4B are screenshots showing visualizations of a portion of a functional map according to one embodiment of the present invention.
Figure 4B:
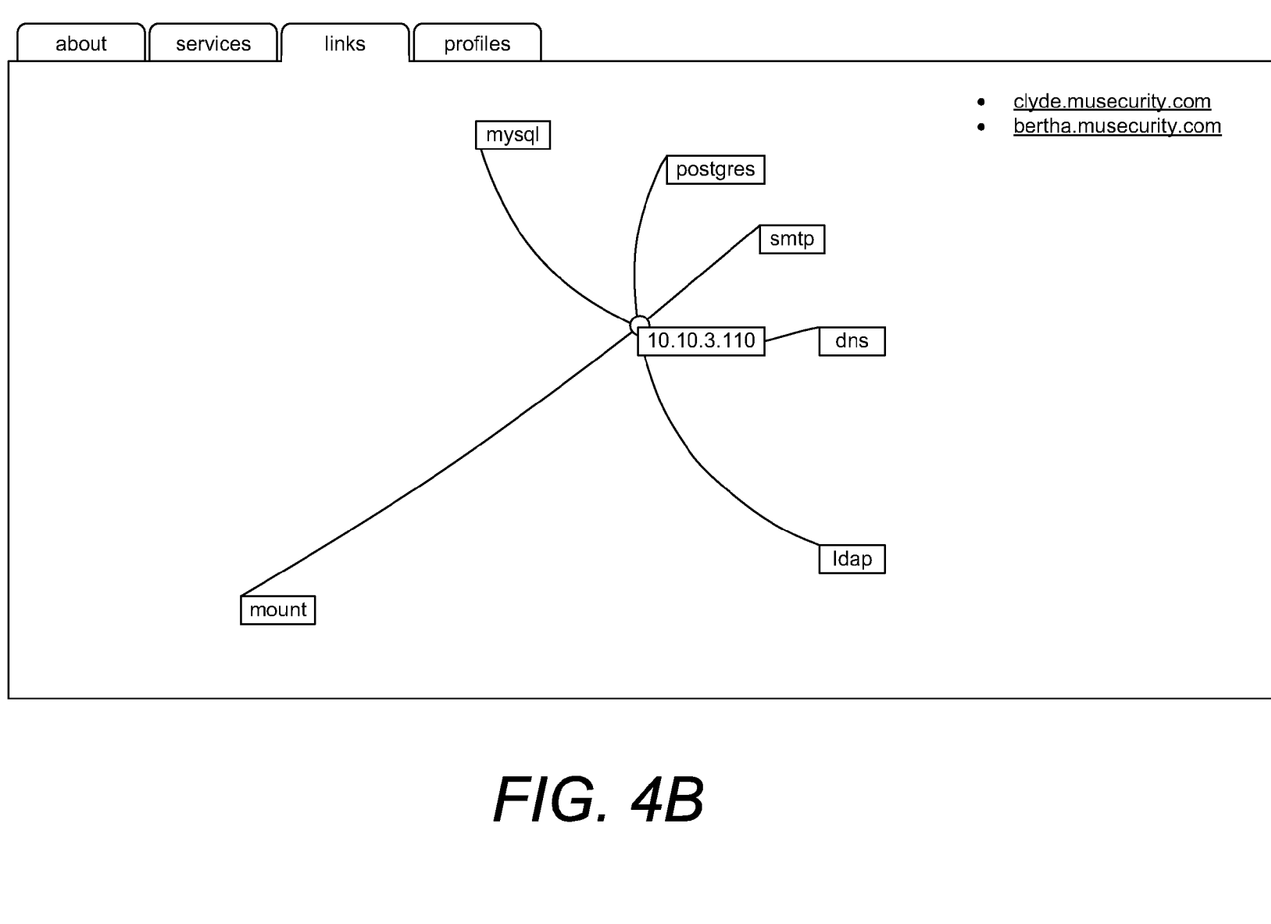

FIGS. 4A and 4B are screenshots showing visualizations of a portion of the functional map according to one embodiment of the present invention. FIG. 4A shows the dependencies of a given host with the IP address 10.1.3.110 clustered by services used. FIG. 4B shows for a given service ("mount") the assets related to the host. As shown, the host is mounted to two assets that are identified by clyde.musecurity.com and bertha.musecurity.com.

Because the collected information not only identifies the discovered assets and their status, but also specifies their roles and functional relationships, a user can drill downward, upward, or sideway, or apply other data mining techniques through the visualization. For example, a user can click the service mount in FIG. 4A to view FIG. 4B, and click the hyperlink clyde.musecurity.com in FIG. 4B to view a visualization of assets and services related to the underlying asset.

Figure 5:
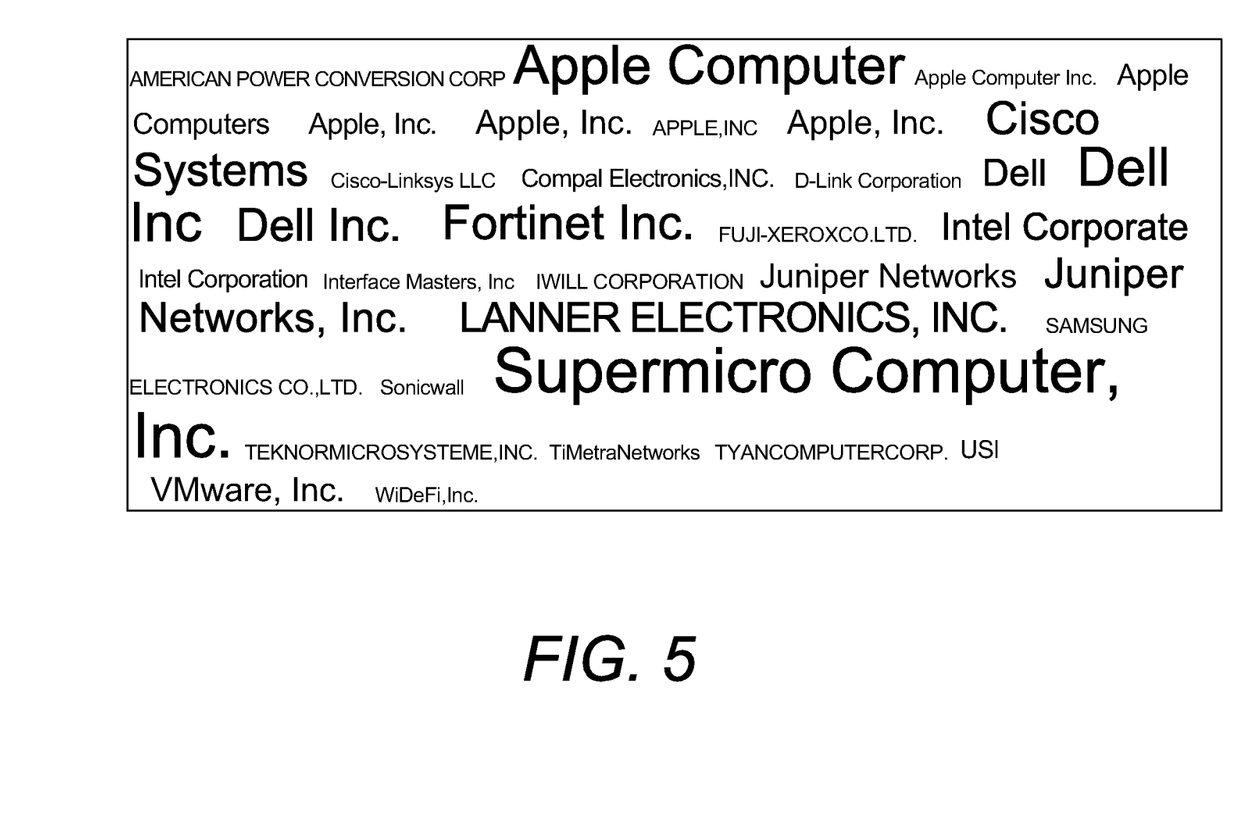
FIG. 5 is a screenshot showing an example visualization according to one embodiment of the present invention.

FIG. 5 is a screenshot showing another example visualization according to one embodiment of the present invention. The visualization is a tag cloud of all the hardware network adapters of various hosts identified in the network system 120. The size of the font is scaled based on the number of assets matching the particular network adapter vendor. As shown, there are more network adapters from Supermicro Computer, Inc. than those from vendors like D-Link Corporation.

Other examples include a calendar view of life spans of SSL certificates for all known assets. A user can easily identify expiring SSL certificates in real time. In addition, tests, assertions, alerts, and/or triggers can be attached to the underlying asset data. For example, a trigger can be set to send an email to a network administrator 30 days before an SSL certificate expires.

B. Index and Search

Figure 6:
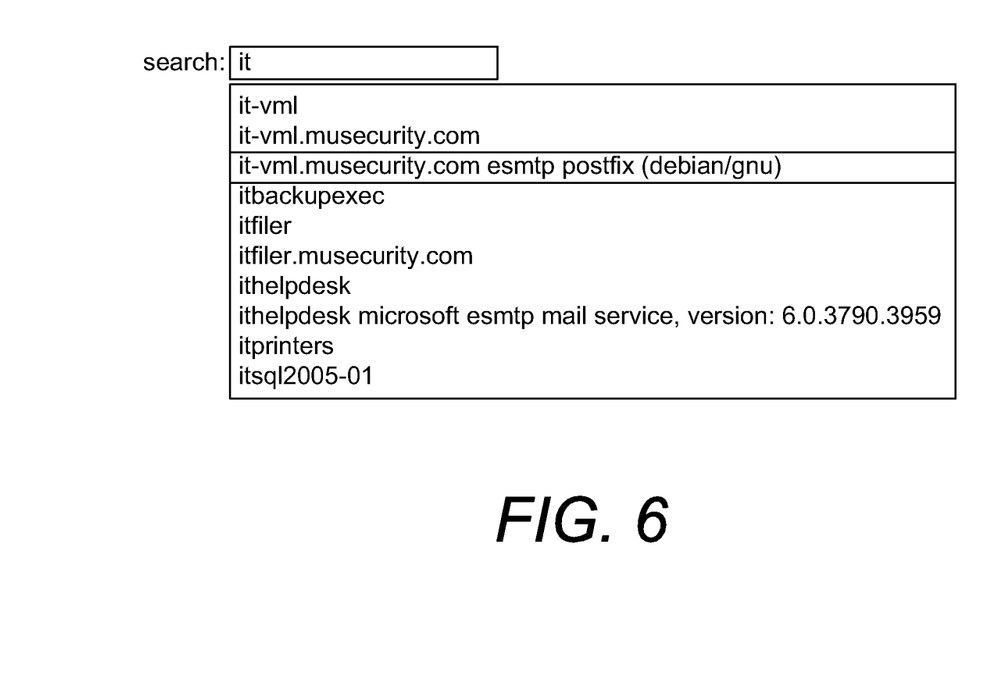
FIG. 6 is a screenshot illustrating a user search according to one embodiment of the present invention.

The collected data can be kept up-to-date, indexed, and available for searches. FIG. 6 is a screenshot illustrating a user search for the keyword "it", which instantly results in various keywords being matched, according to one embodiment of the present invention. These keywords further lead to specific assets that match the entered word. The search result also includes assets that has "it" in its profile or a host name that starts with "it". The sources of the searched information can be extracted from real time results from queries of a number of different protocols, such as DOMs of DNS requests, Net-BIOS, and SSL Certificates.

C. Asset Profiling

Figure 7:
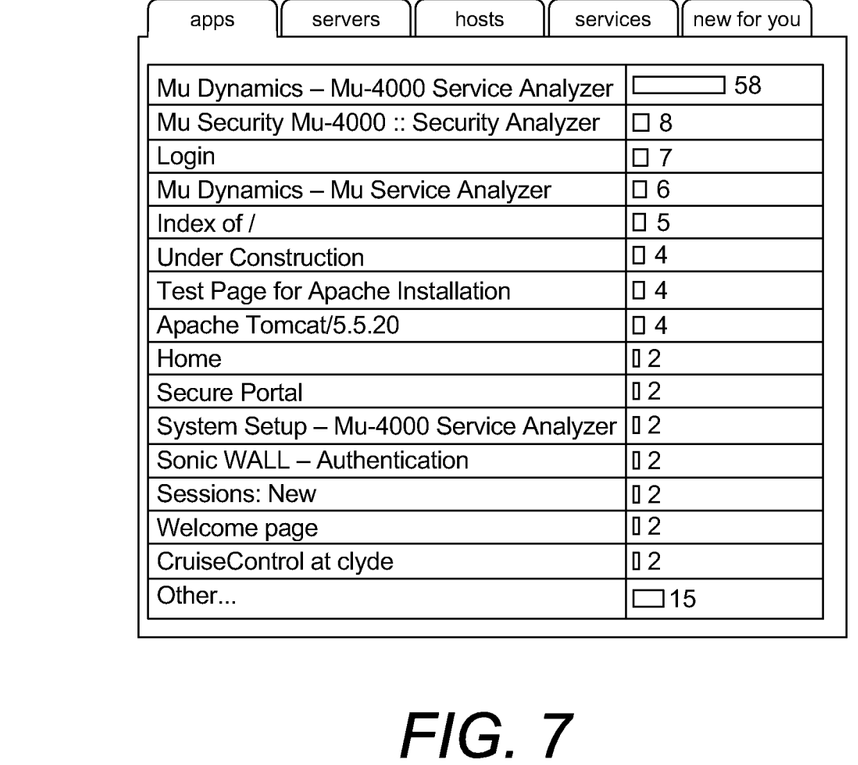
FIG. 7 is a screenshot including a diagram showing web applications running on various assets according to one embodiment of the present invention.

Up-to-date asset data can be used to construct real time profiles for all known assets on the network system 120. The asset profiles can be used to conduct similarity comparisons among assets, and generate distance metrics for the assets based on their similarities. For example, asset information can be converted into normalized documents that are subject to document comparisons. In addition, assets can be classified based on their similarities or compliance with customizable signatures. Such classification can be visualized to users. FIG. 7 is a screenshot including a diagram showing the web applications running on various assets according to one embodiment of the present invention. This diagram is useful, for example, for organizations to plan for capacity as well as to eliminate under-utilized resources.

D. Change Management

The discovery system 110 can be scheduled to periodically crawl the network system 120. The resulting data can be stored with associated time stamp. As a result, the data can be used to detect changes in system behavior, either configuration or service degradation on an on-going basis. Such timestamped asset information can be used to create timeliness. A common aspect of change management is tracking progress towards a goal in the form of checklists. By tying a search parameter directed to a goal, a dynamic checklist refreshed constantly can be generated by the discovery system 110. One example of such a use case is upgrading hosts that are running a particular application. The discovery system 110 can keep track of how many hosts have not yet been updated. Historically such a task has been tracked and managed using static spreadsheets.

Services other than those listed above can be provided using the crawled data. For example, the collected asset data can be used to conduct tests and verifications. As another example, while deploying a network system, the discovery system 110 can be used to discover and track assets and functional relationships among the assets in the network to ensure proper deployment. Further information about the test driven deployment is found in U.S. Utility patent application Ser. No. 12/234,450, filed Sep. 19, 2008, the content of which is hereby incorporated by reference in its entirety.

Alternative Embodiments

In one embodiment, multiple discovery systems 110 might be deployed across multiple networks all of which generate information that is merged to get a global perspective across the multiple networks. The information generated from these multiple discovery systems 110 can be synchronized and/or merged in a central data store.

Even though the discovery system 110 is described above to discover assets available in a network, one skilled in the art would understand that it can be applied to discover assets residing on a single device (e.g., an unconnected computer).

The discovery system 110 can automatically discover additional assets, up-to-date information about known assets, and their roles and functional relationships in real time. In addition, the discovered information can be used to provide advanced services regarding the network system and assets within.

In the preceding description, for purposes of explanation, numerous specific details are set forth in order to provide a thorough understanding of the disclosure. It will be apparent, however, to one skilled in the art that the disclosure can be practiced without these specific details. In other instances, structures and devices are shown in block diagram form in order to avoid obscuring the disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, objects, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present disclosure also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems appears in the description herein. In addition, the present disclosure is not described with reference to any particular programming language. It will be appreciated that a variety of programming languages may be used to implement the teachings of the disclosure as described herein.

What is claimed is:

1. A method for discovering assets and roles and functional relationships of the assets in a network including a plurality of related assets, each supporting one or more protocols, the method comprising:
   (1) executing a query associated with a seed asset, the query representing a protocol message of a protocol supported by the seed asset, the seed asset being related to at least one of the plurality of related assets;
   (2) contextually analyzing the query response for determining references to a first asset, a role of the first asset, and a functional relationship between the seed asset and the first asset based on a protocol grammar of the protocol;
      wherein the role specifies general functions performed by the first asset; and
      wherein the functional relationship specifies at least one specific function performed by the seed asset for the first asset or performed by the first asset for the seed asset;
   (3) determining a query to send the first asset based on the role and the functional relationship; and
   (4) recursively applying steps (1) through (3) for determining references to assets and their roles and functional relationships.

2. The method of claim 1, wherein recursively applying steps (1) through (3) further comprises recursively applying steps (1) through (3) using a second protocol different from the protocol supported by the seed asset.

3. The method of claim 1, wherein the functional relationship between the seed asset and the first asset is associated with a protocol independent from the protocol supported by the seed asset.

4. The method of claim 1, wherein the asset comprises one of the following: a service, an interface, a domain, an application, a server, a host, and a subnet.

5. The method of claim 1, further comprising:
   (5) normalizing the query response into a structured document based on the protocol grammar of the protocol.

6. The method of claim 1, wherein data in the query response is stored and indexed for subsequent searches.

7. The method of claim 1, further comprising:
   (5) continuously applying steps (1) through (3) to all known assets to keep information about the known assets up-to-date.

8. The method of claim 1, further comprising:
   (5) receiving a network range for network addresses of assets of interest,
   wherein contextually analyzing the query response further comprises:
      (2.1) comparing a network address of the first asset against the network range, and
      (2.2) responding to the network address being outside the network range, not determining the query associated with the first asset based on the role and the functional relationship.

9. The method of claim 2, wherein recursively applying steps (1) through (3) further comprises recursively applying steps (1) through (3) using a third protocol different from the protocol supported by the seed asset and different from the second protocol.

10. The method of claim 1, further comprising constructing a network functional topology map based on the determined roles and functional relationships of the assets.

11. A computer program product having a non-transitory computer-readable medium having computer program instructions recorded thereon for discovering assets and roles and functional relationships of the assets in a network including a plurality of related assets, each supporting one or more protocols, the computer program instruction comprising instructions for:
   (1) executing a query associated with a seed asset, the query representing a protocol message of a protocol supported by the seed asset, the seed asset being related to at least one of the plurality of related assets;
   (2) contextually analyzing the query response for determining references to a first asset, a role of the first asset, and a functional relationship between the seed asset and the first asset based on a protocol grammar of the protocol;
      wherein the role specifies general functions performed by the first asset; and
      wherein the functional relationship specifies at least one specific function performed by the seed asset for the first asset or performed by the first asset for the seed asset;
   (3) determining a query to send the first asset based on the role and the functional relationship; and
   (4) recursively applying steps (1) through (3) for determining references to assets and their roles and functional relationships.

12. The computer program product of claim 11, wherein recursively applying steps (1) through (3) further comprises recursively applying steps (1) through (3) using a second protocol different from the protocol supported by the seed asset.

13. The computer program product of claim 11, wherein the functional relationship between the seed asset and the first asset is associated with a protocol independent from the protocol supported by the seed asset.

14. The computer program product of claim 11, wherein the asset comprises one of the following: a service, an interface, a domain, an application, a server, a host, and a subnet.

15. The computer program product of claim 11, wherein the computer program instruction further comprises instructions for:
   (5) normalizing the query response into a structured document based on the protocol grammar of the protocol.

16. The computer program product of claim 11, wherein data in the query response is stored and indexed for subsequent searches.

17. The computer program product of claim 12, wherein recursively applying steps (1) through (3) further comprises recursively applying steps (1) through (3) using a third protocol different from the protocol supported by the seed asset and different from the second protocol.

18. The computer program product of claim 11, wherein the computer program instruction further comprises instructions for constructing a network functional topology map based on the determined roles and functional relationships of the assets.

19. An apparatus for discovering assets and roles and functional relationships of the assets in a network including a plurality of related assets, each supporting one or more protocols, the apparatus comprising:
 a discovery component configured to execute a query associated with a seed asset, the query representing a protocol message of a protocol supported by the seed asset, the seed asset being related to at least one of the plurality of related assets;
 an analyzing component configured to contextually analyze the query response to determine references to a first asset, a role of the first asset, and a functional relationship between the seed asset and the first asset based on a protocol grammar of the protocol; and
  wherein the role specifies general functions performed by the first asset; and
  wherein the functional relationship specifies at least one specific function performed by the seed asset for the first asset or performed by the first asset for the seed asset;
 the discovery component further configured to determine a query to send the first asset based on the role and the functional relationship;
 wherein the above components are configured to recursively interrogate discovered assets to determine references to additional assets and their roles and functional relationships.

20. The apparatus of claim 19, wherein the discovery and analyzing components are further configured to recursively interrogate discovered assets to determine references to additional assets and their roles and functional relationships using a second protocol different from the protocol supported by the seed asset.

21. The apparatus of claim 19, wherein the functional relationship between the seed asset and the first asset is associated with a protocol independent from the protocol supported by the seed asset.

22. The apparatus of claim 19, wherein the asset comprises one of the following: a service, an interface, a domain, an application, a server, a host, and a subnet.

23. The apparatus of claim 19, further comprising:
 a protocol engine configured to normalize the query response into a structured document based on the protocol grammar of the protocol.

24. The apparatus of claim 19, wherein data in the query response is stored and indexed for subsequent searches.

25. The apparatus of claim 20, wherein the discovery and analyzing components are further configured to recursively interrogate discovered assets to determine-references to additional assets and their roles and functional relationships using a third protocol different from the protocol supported by the seed asset and different from the second protocol.

26. The apparatus of claim 19, wherein the discovery and analyzing components are further configured to construct a network functional topology map based on the determined roles and functional relationships of the assets.

* * * * *